US012755922B1

(12) United States Patent
Wang et al.

(10) Patent No.: US 12,755,922 B1
(45) Date of Patent: Oct. 6, 2026

(54) METHOD OF FABRICATING A HIGH-PRESSURE LASER-SUSTAINED-PLASMA LAMP

(71) Applicant: KLA Corporation, Milpitas, CA (US)

(72) Inventors: Mark S. Wang, San Ramon, CA (US); Joshua Wittenberg, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/595,107

(22) Filed: Mar. 4, 2024

Related U.S. Application Data

(62) Division of application No. 17/837,889, filed on Jun. 10, 2022, now Pat. No. 11,923,185.

(60) Provisional application No. 63/211,003, filed on Jun. 16, 2021.

(51) Int. Cl.

| | |
|---|---|
| ***H01J 9/26*** | (2006.01) |
| ***H01J 9/24*** | (2006.01) |
| ***H01J 61/54*** | (2006.01) |

(52) U.S. Cl.
CPC .............. *H01J 9/266* (2013.01); *H01J 9/247* (2013.01); *H01J 61/54* (2013.01)

(58) Field of Classification Search
CPC ... H01J 61/82–827; H01J 61/073–0735; H01J 61/16; H01J 61/366–368
See application file for complete search history.

(56) References Cited

U.S. PATENT DOCUMENTS

| | | | |
|---|---|---|---|
| 4,376,906 | A | 3/1983 | Szilagyi et al. |
| 5,608,526 | A | 3/1997 | Piwonka-Corle et al. |
| 5,999,310 | A | 12/1999 | Shafer et al. |
| 6,297,880 | B1 | 10/2001 | Rosencwaig et al. |
| 7,345,825 | B2 | 3/2008 | Chuang et al. |
| 7,525,649 | B1 | 4/2009 | Leong et al. |
| 7,957,066 | B2 | 6/2011 | Armstrong et al. |
| 9,228,943 | B2 | 1/2016 | Wang et al. |
| 2002/0135305 | A1 | 9/2002 | Horiuchi et al. |
| 2004/0169476 | A1 | 9/2004 | Ehrlichmann et al. |
| 2009/0079346 | A1 | 3/2009 | Bewlay et al. |

(Continued)

FOREIGN PATENT DOCUMENTS

| | | | |
|---|---|---|---|
| CN | 108054077 | A | 5/2018 |
| CN | 112885699 | A | 6/2021 |

(Continued)

OTHER PUBLICATIONS

Search Report and Written Opinion in International Application No. PCT/US2022/033314 dated Oct. 7, 2022, 8 pages.

(Continued)

*Primary Examiner* — Mariceli Santiago
(74) *Attorney, Agent, or Firm* — Suiter Swantz IP

(57) ABSTRACT

A method of forming a high-pressure plasma lamp includes providing a lamp bulb. The lamp bulb includes a top channel and a bottom channel. The method includes inserting a top electrode element into the top channel of the lamp bulb. The method includes providing a glass tubular structure attached to a bottom electrode element. The method includes filling the lamp bulb with a liquified gas through the bottom channel of the lamp bulb. The method includes inserting the bottom electrode element and the glass tubular structure into the bottom channel.

7 Claims, 8 Drawing Sheets

(56) References Cited

U.S. PATENT DOCUMENTS

| | | | | |
|---|---|---|---|---|
| 2012/0133279 | A1* | 5/2012 | Miyazawa .............. | H01J 9/266 313/623 |
| 2013/0052903 | A1 | 2/2013 | Gilliard et al. | |
| 2020/0273694 | A1* | 8/2020 | Grothmann ........... | H01J 61/827 |

FOREIGN PATENT DOCUMENTS

| | | | |
|---|---|---|---|
| JP | H06111785 | A | 4/1994 |
| JP | H11329350 | A | 11/1999 |
| JP | 2001325915 | A | 11/2001 |
| JP | 2005519436 | A | 6/2005 |
| JP | 2009054345 | A | 3/2009 |
| JP | 2023536367 | A | 8/2023 |
| TW | 200304164 | A | 9/2003 |

OTHER PUBLICATIONS

Taiwan Patent Office, Office Action received in TW Application No. 111122376, May 27, 2025, 22 pages (including translation).

Japanese Patent Office, Office Action received in JP Application No. 2023-555424, Sep. 2, 2025, 13 pages (including translation).

* cited by examiner

400

600

METHOD OF FABRICATING A HIGH-PRESSURE LASER-SUSTAINED-PLASMA LAMP

CROSS-REFERENCE TO RELATED APPLICATIONS

The present application constitutes a continuation application of U.S. patent application Ser. No. 17/837,889, filed on Jun. 10, 2022, which is a regular (non-provisional) patent application of U.S. Provisional Patent Application Ser. No. 63/211,003, filed Jun. 16, 2021, whereby are of the applications above are incorporated herein by reference in their entirety.

TECHNICAL FIELD

The present invention generally relates to plasma lamp fabrication, and, more particularly, to a method for fabricating a high-pressure laser-sustained-plasma lamp.

BACKGROUND

As the demand for integrated circuits having ever-small device features continues to increase, the need for improved illumination sources used for inspection of these ever-shrinking devices continues to grow. One such illumination source includes a laser-sustained plasma source. Laser-sustained plasma (LSP) light sources are capable of producing high-power broadband light. Laser-sustained light sources operate by focusing laser radiation into a gas volume in order to excite the gas, such as argon or xenon, into a plasma state, which in turn emits broadband light. Laser-sustained plasma light sources typically operate by focusing laser light into a sealed lamp containing a selected working gas.

As shown in FIG. 1, traditional plasma lamps include electrodes 14, 16 that are attached to both ends of a bulb 10. Traditional plasma lamps include a fill port 12 attached to the bulb to allow for the insertion of a liquified gas mixture 18. The fill port is then immediately sealed 20 once the liquified gas mixture is filled within the bulb. This process is widely used in production of plasma lamps and works well for low and medium pressure lamps, specifically. However, due to the non-uniformity created in the lamp construction, this fill port becomes a weak spot on the lamp, reducing the maximum pressure that the lamp can operate at. This becomes especially problematic as a result of process variation in the fill port attachment and the fill port seal process. As such, it would be advantageous to provide method and apparatus to remedy the shortcomings of the approaches identified above.

SUMMARY

A method of forming a plasma lamp is disclosed, in accordance with one or more illustrative embodiments of the present disclosure. In one illustrative embodiment, the method includes providing a lamp bulb, wherein the lamp bulb includes a top channel and a bottom channel. In another illustrative embodiment, the method includes inserting a top electrode element into the top channel of the lamp bulb. In another illustrative embodiment, the method includes providing a glass tubular structure attached to a bottom electrode element. In another illustrative embodiment, the method includes filling the lamp bulb with a liquified gas through the bottom channel of the lamp bulb. In another illustrative embodiment, the method includes inserting the bottom electrode element and the glass tubular structure into the bottom channel.

A lamp bulb is disclosed, in accordance with one or more illustrative embodiments of the present disclosure. In one illustrative embodiment, the lamp bulb includes a lamp body. In another illustrative embodiment, the lamp bulb includes a top channel. In another illustrative embodiment, the lamp bulb includes a bottom channel. In another illustrative embodiment, the lamp bulb includes a top electrode element sealed within the top channel. In another illustrative embodiment, the lamp bulb includes a bottom electrode element sealed within a glass tubular structure, wherein the glass tubular structure is sealed within the bottom channel, wherein an interior wall of the bottom channel is sealed to an exterior wall of the glass tubular structure. In another illustrative embodiment, the lamp bulb contains a gas and is configured to generate a plasma within the lamp bulb.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to a plasma lamp fabrication method for forming a high-pressure plasma lamp to meet the demand for bright LSP light sources in current semiconductor wafer inspection tools. Embodiments of the present disclosure are directed to a high-pressure plasma lamp without a seal port. A lamp formed without a seal port is stronger than lamps with a seal port due to the non-uniformity created in the lamp structure caused by the presence of the seal port. The seal port becomes a weak point of a given lamp, thereby reducing the maximum operating pressure of the lamp. The high-pressure lamp of the present disclosure, formed without a seal port, is capable of operating at high pressure.

Figure 1:
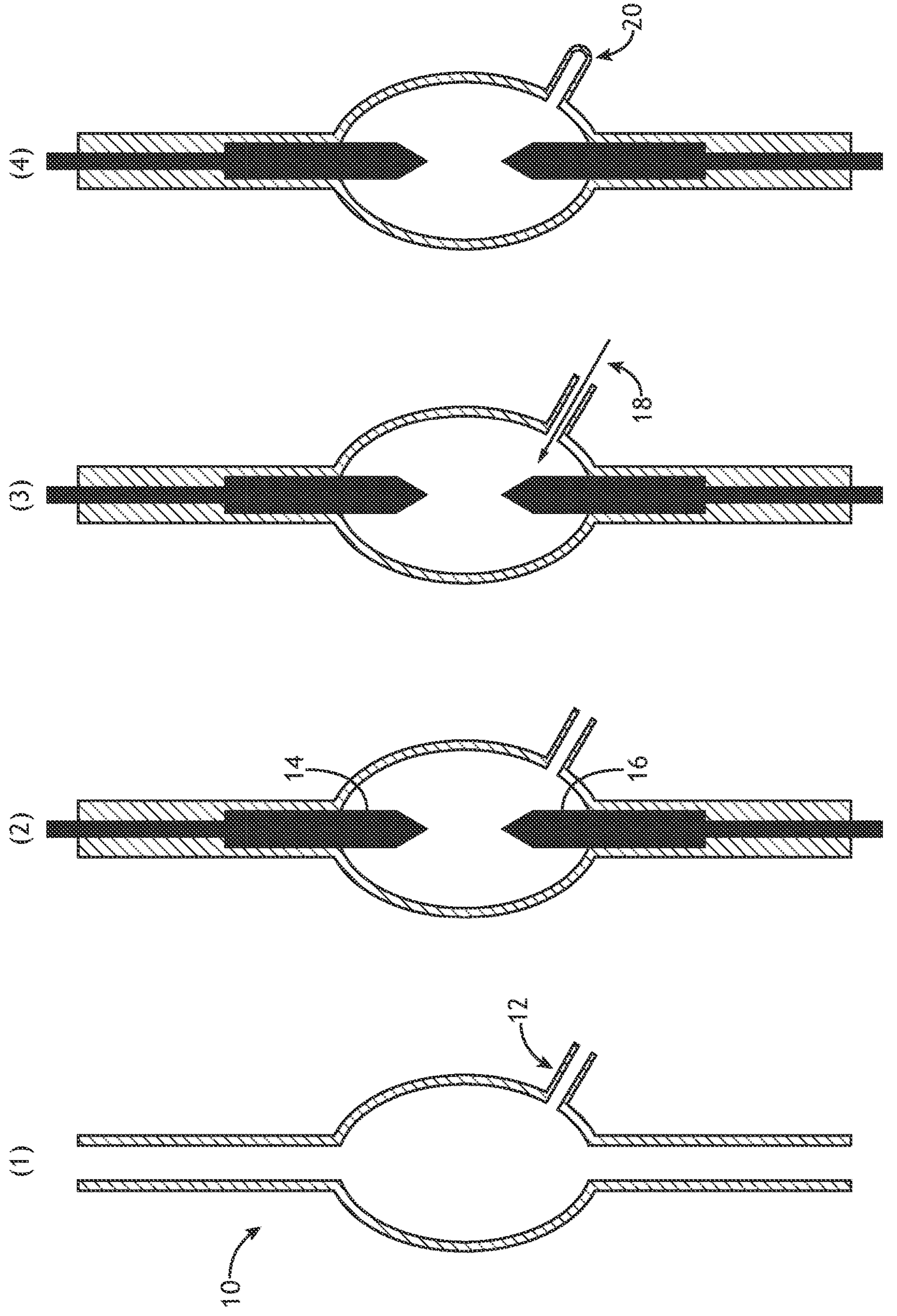
Prior Art FIG. 1
FIG. 1 illustrates a conceptual view of the traditional lamp-forming process for low- and medium-pressure plasma lamps.
Figure 2:
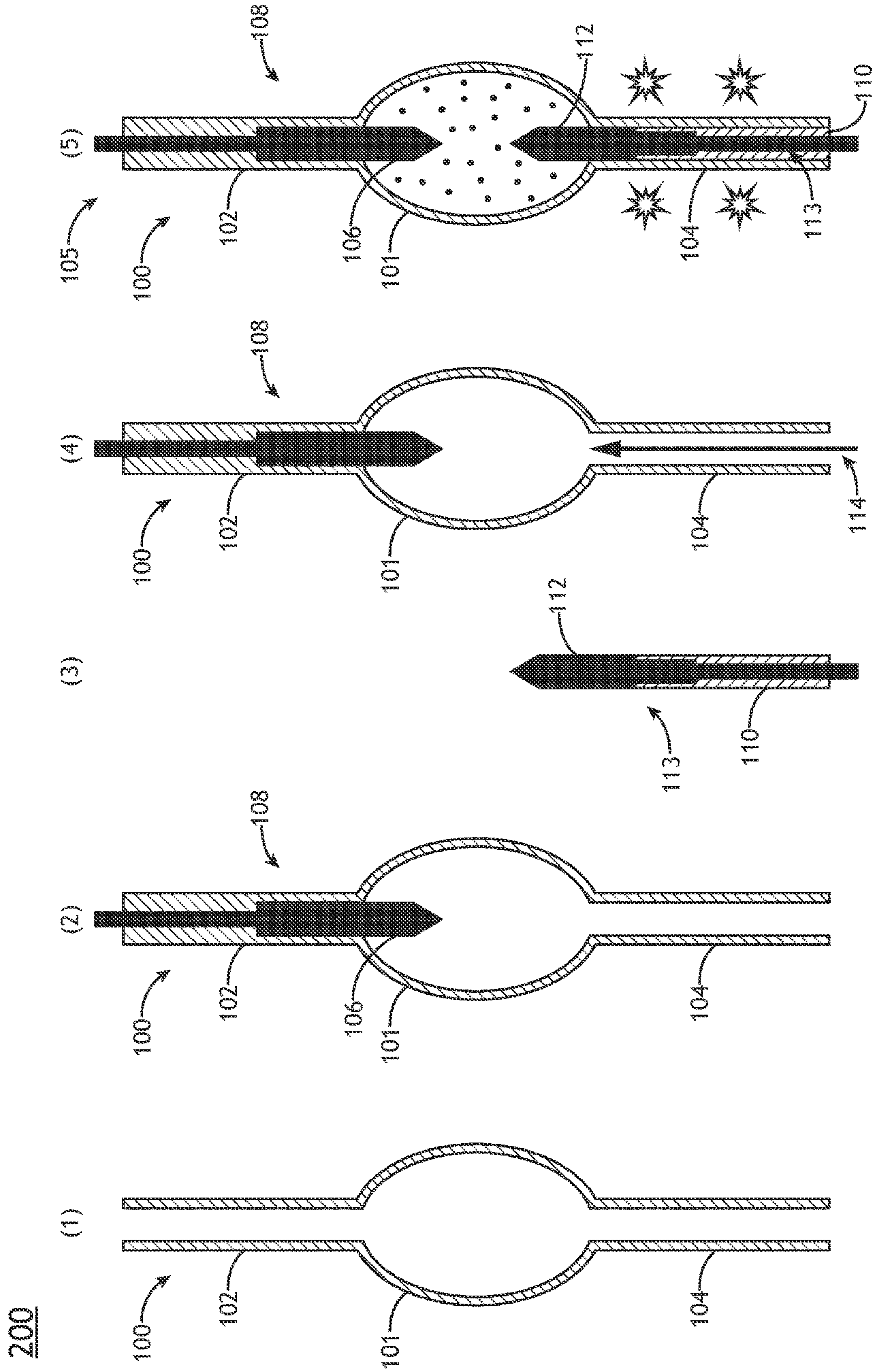
FIG. 2 illustrates a conceptual view of a process of forming a high-pressure plasma lamp equipped with electrodes, in accordance with one or more embodiments of the present disclosure.

FIG. 2 illustrates a conceptual view of a process 200 of forming a high-pressure plasma lamp 105 equipped with electrodes, in accordance with one or more embodiments of the present disclosure. The process 200 may include steps (1)-(5) and results in a sealed gas-filled lamp bulb 105 equipped with top and bottom electrodes. It is noted process 200 is not limited to steps (1)-(5) and it is contemplated that additional steps may be performed within the scope of process 200.

In step (1), an initial lamp bulb 100 is provided. In embodiments, the lamp bulb 100 includes a lamp body 101, a top channel 102, and a bottom channel 104.

In step (2), a top electrode element 108 is inserted into the top channel 102 of the lamp bulb 100. In embodiments, the top electrode element 108 (e.g., metal electrode) may be the anode of the lamp bulb 100. The top end of the body 101 of the lamp bulb 100 corresponds to the top of the plasma generated within the body 101. During operation, the high-temperature plume from the plasma will rise towards the top portion 108 of the body 101. In embodiments, in preparing the lamp bulb 100, a full heat treatment may be applied to the top portion 108 of the lamp bulb 100 to seal the top electrode 106 within the top channel 102.

In step (3), a glass tubular structure 110 is attached to a bottom electrode element 112 to form a tubular-electrode assembly 113. In embodiments, the bottom electrode element 112 (e.g., metal electrode) is a cathode of the lamp bulb 100. In this sense, the top electrode element 106 comprises the anode and the bottom electrode element 112 comprises the cathode of the lamp bulb 100 and may be used to initiate a plasma within the lamp bulb 100. It is noted that this configuration is not a limitation on the scope of the present disclosure. In embodiments, the bottom electrode element 112 comprises the anode and the top electrode element 106 comprises the cathode. In embodiments, the lamb bulb 100 is electrodeless and the plasma is initiated using a laser pump source. In this embodiment, the cathode may be pre-attached to the glass tubular structure 110. For example, the cathode may be pre-attached to the glass tubular structure 110 and an electrical wire may pass through the tubular structure 110 for current conduction used for electrical arcing to initiate the plasma. The glass tubular structure 110 may have a slightly smaller diameter than that of the inner tube of the bottom channel 104 to allow insertion of the tubular-electrode assembly 113 into the bottom channel 104. In embodiments, the glass tubular structure 110 is made of the same glass as the bulb glass to minimize material property differences such as, but not limited to, viscosity or coefficient of thermal expansion. For example, the glass tubular structure 110 and the lamp bulb 100 may be formed from fused silica glass.

In step (4), the lamb bulb 100 is filled with a liquified gas 114 through the bottom channel 104 of the lamp bulb 100. For example, the liquified gas 114 may include one or more of Xe, Ar, Ne, Kr, He $N_2$, $H_2O$, $O_2$, $H_2$, $D_2$, $F_2$, $SF_6$. By way of another example, the liquified gas 114 may include a mixture of two or more of Xe, Ar, Ne, Kr, He, $N_2$, $H_2O$, $O_2$, $H_2$, $D_2$, $F_2$, or $SF_6$.

In step (5), the tubular-electrode assembly 113 is inserted into the bottom channel 104 of the lamp bulb 100. In embodiments, as shown in FIG. 2, the tubular-electrode assembly 113 may be put in place after the liquified gas 114 is transferred into the lamp bulb 100 through the open bottom channel 104. In alternative embodiments, the tubular-electrode assembly 113 may be put in place prior to sealing, leaving a small gap for transferring the gas into the lamp bulb 100.

In embodiments, after the gas 114 is transferred into the lamb bulb 100 and the tubular-electrode assembly 113 is positioned in the bottom channel 104, a heat treatment (e.g., high temperature flame) is applied to seal the gap between the glass tubular structure 110 and bottom channel 104 of the lamp bulb 100. The end result is a sealed port-less lamp 105 with top and bottom electrodes and contains a gas for plasma generation in a LSP broadband source.

In alternative embodiments, the bottom channel 104 may be sealed without the use of the glass tubular structure 110. In this embodiment, the bottom channel 104 may be sealed by sealing the bottom channel 104 with only the metallic electrode and metallic electrical wire inside (no separate glass tubular assembly inserted into the bottom channel 104).

Figure 3:
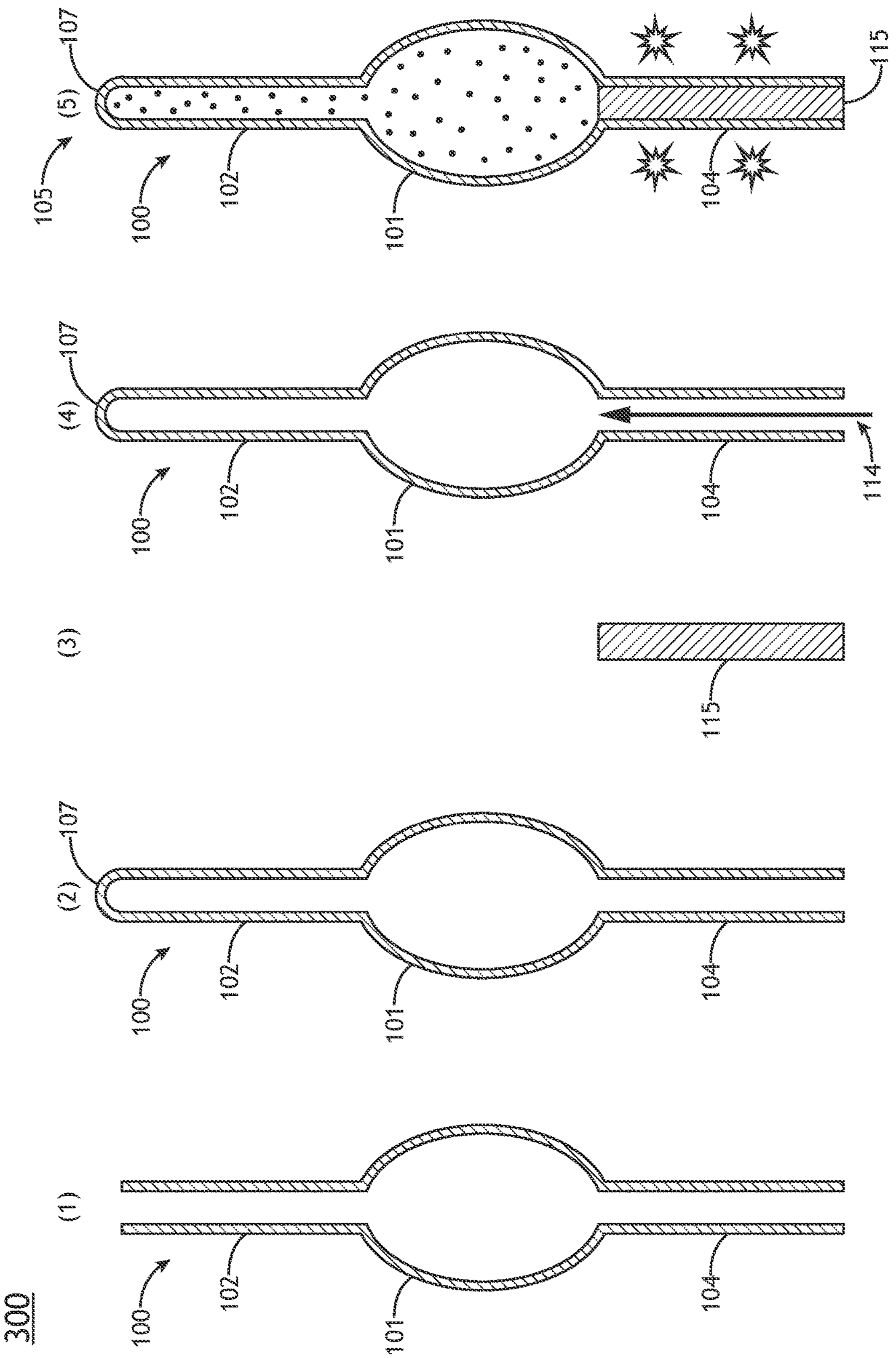
FIG. 3 illustrates a conceptual view of a process of forming a high-pressure plasma lamp without electrodes, in accordance with one or more embodiments of the present disclosure.

FIG. 3 illustrates a conceptual view of a process 300 of forming a plasma lamp 105 without electrodes, in accordance with one or more embodiments of the present disclosure. The process 300 may include steps (1)-(5) and results in a sealed gas-filled electrodeless lamp bulb 100. It is noted process 300 is not limited to steps (1)-(5) and it is contemplated that additional steps may be performed within the scope of process 300

In step (1), the initial lamp bulb 100 is provided.

In step (2), a top portion 107 of the top channel 102 is sealed. For example, the top portion 107 of the top channel 102 may be sealed using traditional glass bulb production techniques (e.g., high temperature flame).

In step (3), a glass cylindrical structure 115 is provided. For example, the glass tubular structure 115 may include, but is not limited to, a solid glass rod. The glass tubular structure 115 may have a slightly smaller diameter than that of the inner tube of the bottom channel 104 to allow insertion of the glass cylindrical structure 115 into the bottom channel 104. In embodiments, the glass cylindrical structure 115 is made of the same glass as the bulb glass to minimize material property differences such as, but not limited to, viscosity or coefficient of thermal expansion. For example, the glass cylindrical structure 115 and the lamp bulb 100 may be formed from fused silica glass.

In step (4), the lamb bulb 100 is filled with a liquified gas 114 through the bottom channel 104 of the lamp bulb 100. For example, the liquified gas 114 may include one or more of Xe, Ar, Ne, Kr, He $N_2$, $H_2O$, $O_2$, $H_2$, $D_2$, $F_2$, $SF_6$. By way of another example, the liquified gas 114 may include a mixture of two or more Xe, Ar, Ne, Kr, He, $N_2$, $H_2O$, $O_2$, $H_2$, $D_2$, $F_2$, or $SF_6$.

In step (5), the glass cylindrical structure 115 is inserted into the bottom channel 104 of the lamp bulb 100. In embodiments, as shown in FIG. 3, the glass cylindrical structure 115 may be put in place after the liquified gas 114 is transferred into the lamp bulb 100 through the open bottom channel 104. In alternative embodiments, the glass cylindrical structure 115 may be put in place prior to sealing, leaving a small gap for transferring the gas into the lamp bulb 100.

In embodiments, after the gas 114 is transferred into the lamb bulb 100 and the tubular structure 115 is positioned in the bottom channel 104, a heat treatment (e.g., high temperature flame) is applied to seal the gap between the glass tubular structure 115 and the bottom channel 104 of the lamp bulb 100. The end result is a sealed port-less and electrode-less lamp 105 containing a gas for plasma generation in a LSP broadband source.

Figure 4:
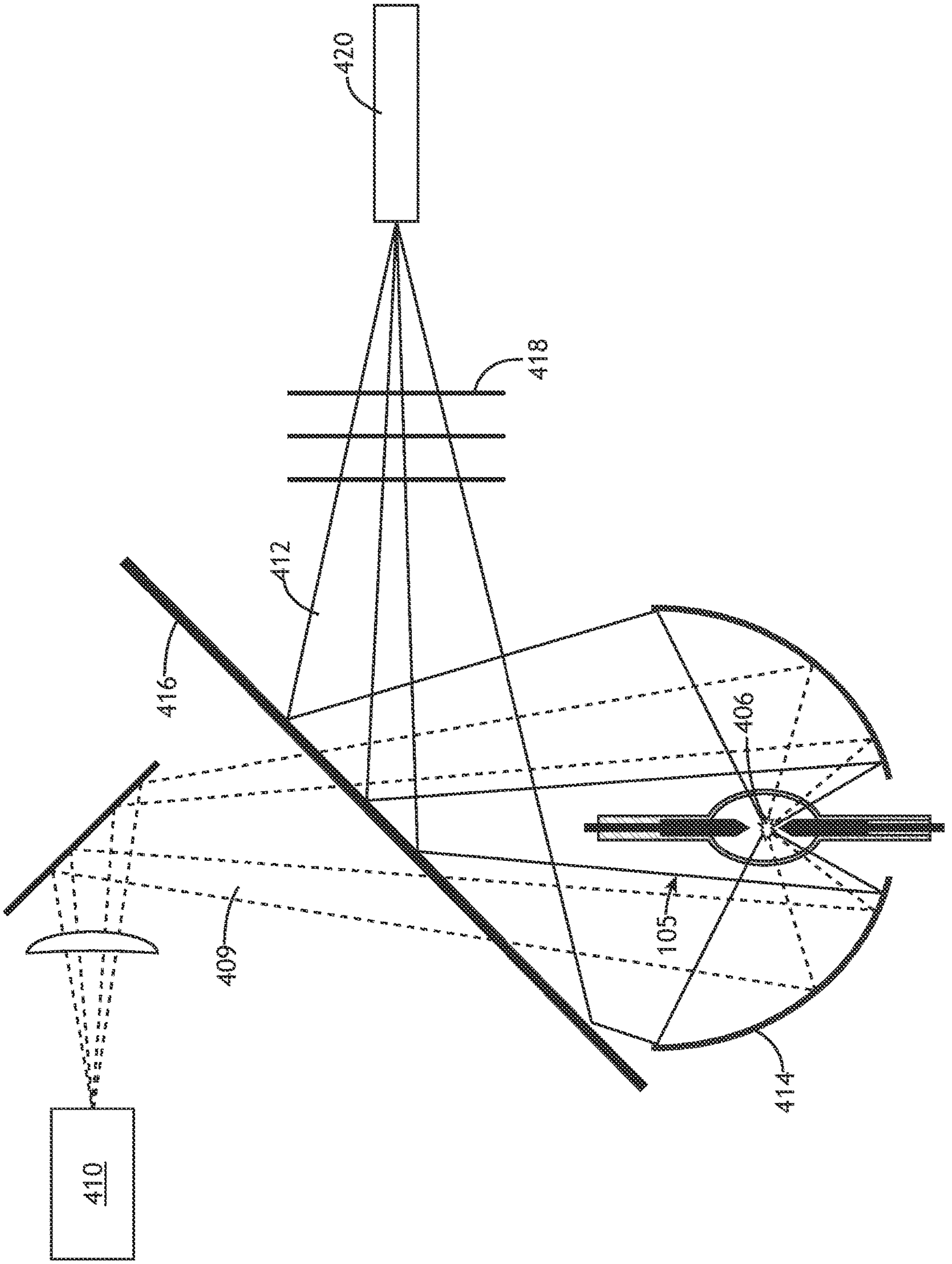
FIG. 4 illustrates a schematic view of an LSP broadband light source incorporating the high-pressure plasma lamp, in accordance with one or more embodiments of the present disclosure

FIG. 4 illustrates a schematic view of an LSP broadband light source 400 integrating the plasma lamp 105 fabricated via methods 200 or 300, in accordance with one or more embodiments of the present disclosure. The LSP source 400 includes a plasma lamp 105 such as the plasma lamp 105 generated in the method 200 (with electrodes) or method 300 (without electrodes). The plasma lamp 105 includes a plasma bulb configured to contain a gas and generate a plasma 406 within the plasma lamp 105. The plasma lamp 105 is formed from a material at least partially transparent to illumination 409 from a pump source 410 and the broadband radiation 412 emitted by the plasma 406.

The pump source 410 is configured to generate illumination 409, which acts as an optical pump, for sustaining the plasma 406 within the plasma lamp 105. For example, the pump source 410 may emit a beam of laser illumination suitable for pumping the plasma 406. In embodiments, the light collector element 414 is configured to direct a portion of the optical pump 409 to a gas contained in the plasma lamp 105 to ignite and/or sustain the plasma 406. The pump source 110 may include any pump source known in the art suitable for igniting and/or sustaining plasma. For example, the pump source 410 may include one or more lasers (e.g., pump lasers). The pump beam may include radiation of any wavelength or wavelength range known in the art including, but not limited to, visible, IR radiation, NIR radiation, and/or UV radiation. The light collector element 414 is configured to collect a portion of broadband radiation 412 emitted from the plasma 406. The broadband radiation 412 emitted from the plasma 406 may be collected via one or more additional optics (e.g., a cold mirror 416) for use in one or more downstream applications (e.g., inspection, metrology, or lithography). The LSP light source 400 may include any number of additional optical elements such as, but not limited to, a filter 418 or a homogenizer 420 for conditioning the broadband radiation 412 prior to the one or more downstream applications. The light collector element 414 may collect one or more of visible, NUV, UV, DUV, and/or VUV radiation emitted by plasma 406 and direct the broadband light 412 to one or more downstream optical elements. For example, the light collector element 414 may deliver infrared, visible, NUV, UV, DUV, and/or VUV radiation to downstream optical elements of any optical characterization system known in the art, such as, but not limited to, an inspection tool, a metrology tool, or a lithography tool. In this regard, the broadband light 412 may be coupled to the illumination optics of an inspection tool, metrology tool, or lithography tool.

Figure 5:
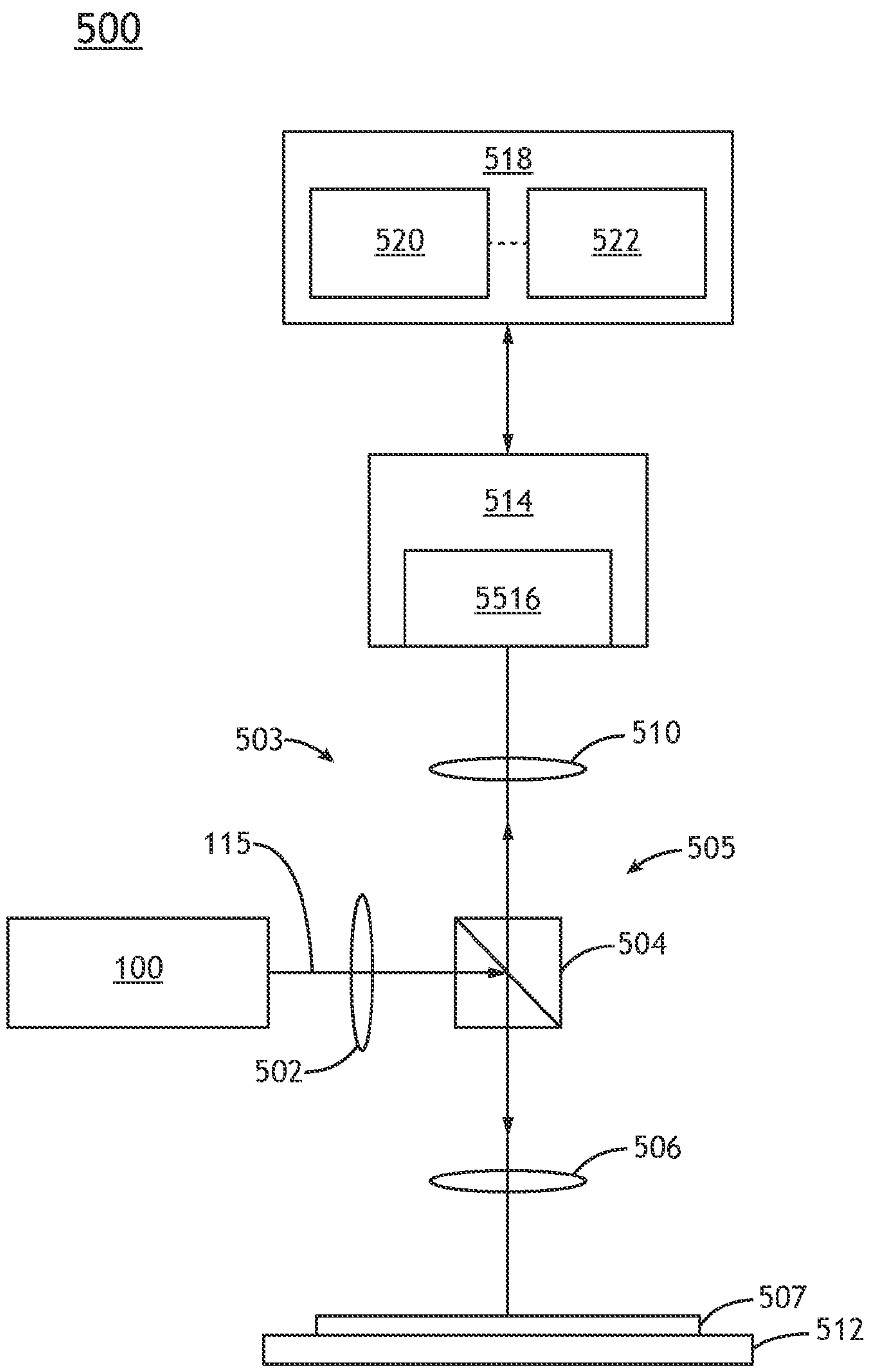
FIG. 5 is a simplified schematic illustration of an optical characterization system implementing the high-pressure plasma lamp, in accordance with one or more embodiments of the present disclosure.

FIG. 5 is a schematic illustration of an optical characterization system 500 implementing the LSP broadband light source 400 equipped with the plasma lamp 105 of the present disclosure, in accordance with one or more embodiments of the present disclosure.

It is noted herein that system 500 may comprise any imaging, inspection, metrology, lithography, or other characterization/fabrication system known in the art. In this regard, system 500 may be configured to perform inspection, optical metrology, lithography, and/or imaging on a sample 507. Sample 507 may include any sample known in the art including, but not limited to, a wafer, a reticle/photomask, and the like. It is noted that system 500 may incorporate one or more of the various embodiments of the LSP broadband light source 400 described throughout the present disclosure.

In embodiments, sample 507 is disposed on a stage assembly 512 to facilitate movement of sample 507. The stage assembly 512 may include any stage assembly 512 known in the art including, but not limited to, an X-Y stage, an R-θ stage, and the like. In embodiments, stage assembly 512 is capable of adjusting the height of sample 507 during inspection or imaging to maintain focus on the sample 507.

In embodiments, the set of illumination optics 503 is configured to direct illumination from the broadband light source 400 to the sample 507. The set of illumination optics 503 may include any number and type of optical components known in the art. In embodiments, the set of illumination optics 503 includes one or more optical elements such as, but not limited to, one or more lenses 502, a beam splitter 504, and an objective lens 506. In this regard, set of illumination optics 503 may be configured to focus illumination from the LSP broadband light source 400 onto the surface of the sample 507. The one or more optical elements may include any optical element or combination of optical elements known in the art including, but not limited to, one or more mirrors, one or more lenses, one or more polarizers, one or more gratings, one or more filters, one or more beam splitters, and the like.

In embodiments, the set of collection optics 505 is configured to collect light reflected, scattered, diffracted, and/or emitted from sample 507. In embodiments, the set of collection optics 505, such as, but not limited to, focusing lens 510, may direct and/or focus the light from the sample 507 to a sensor 516 of a detector assembly 514. It is noted that sensor 516 and detector assembly 514 may include any sensor and detector assembly known in the art. For example, the sensor 516 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 516 may include, but is not limited to, a line sensor or an electron-bombarded line sensor.

In embodiments, detector assembly 514 is communicatively coupled to a controller 518 including one or more processors 520 and memory medium 522. For example, the one or more processors 520 may be communicatively coupled to memory 522, wherein the one or more processors 520 are configured to execute a set of program instructions stored on memory 522. In embodiments, the one or more processors 520 are configured to analyze the output of detector assembly 514. In embodiments, the set of program instructions are configured to cause the one or more processors 520 to analyze one or more characteristics of sample

507. In embodiments, the set of program instructions are configured to cause the one or more processors 520 to modify one or more characteristics of system 500 in order to maintain focus on the sample 507 and/or the sensor 516. For example, the one or more processors 520 may be configured to adjust the objective lens 506 or one or more optical elements 502 in order to focus illumination from LSP broadband light source 400 onto the surface of the sample 507. By way of another example, the one or more processors 520 may be configured to adjust the objective lens 506 and/or one or more optical elements 502 in order to collect illumination from the surface of the sample 507 and focus the collected illumination on the sensor 516.

It is noted that the system 500 may be configured in any optical configuration known in the art including, but not limited to, a dark-field configuration, a bright-field orientation, and the like.

Figure 6:
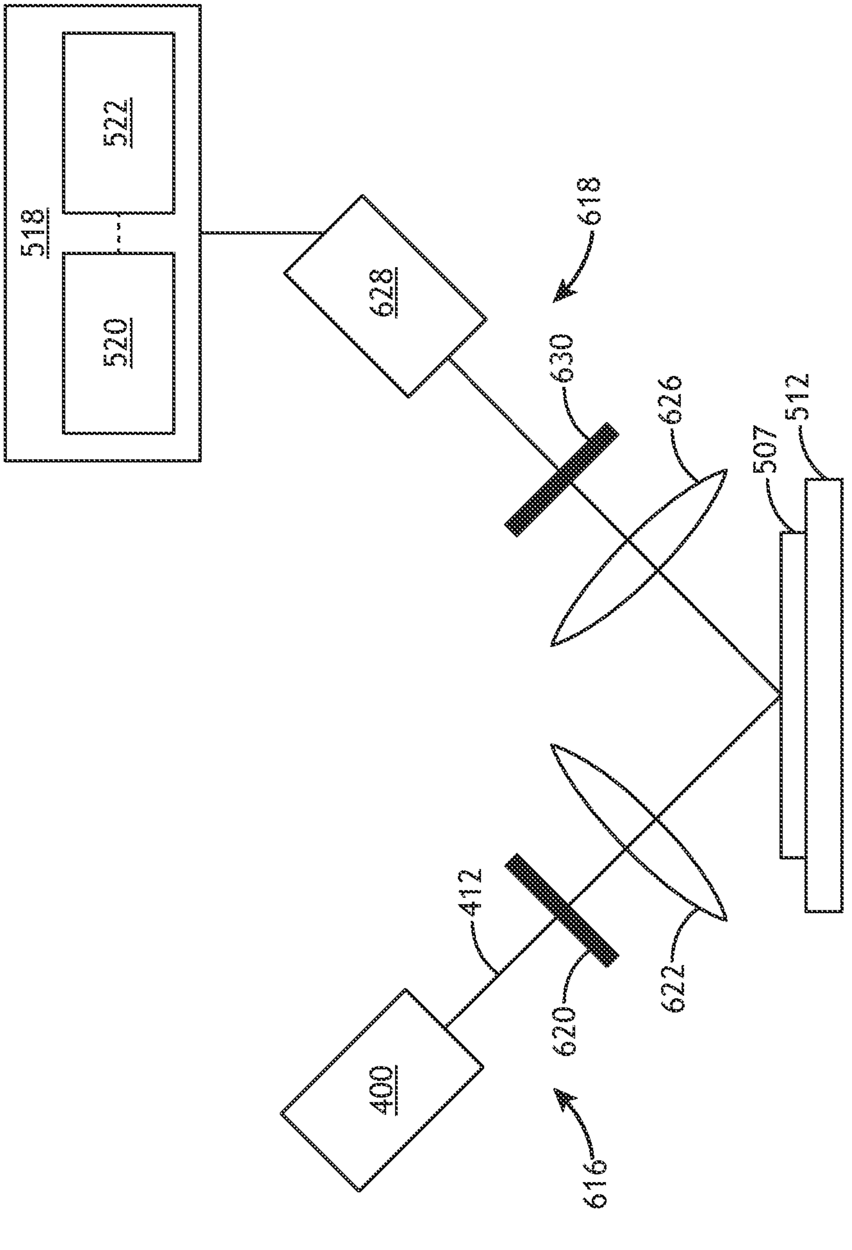
FIG. 6 is a simplified schematic illustration of an optical characterization system implementing the high-pressure plasma lamp, in accordance with one or more embodiments of the present disclosure.

FIG. 6 illustrates a simplified schematic diagram of an optical characterization system 600 arranged in a reflectometry and/or ellipsometry configuration, in accordance with one or more embodiments of the present disclosure. It is noted that the various embodiments and components described with respect to FIGS. 2 through 5 may be interpreted to extend to the system of FIG. 6 and vice-versa. The system 600 may include any type of metrology system known in the art.

In embodiments, system 600 includes the LSP broadband light source 400, a set of illumination optics 616, a set of collection optics 618, a detector assembly 628, and the controller 518.

In this embodiment, the broadband illumination from the LSP broadband light source 400 is directed to the sample 507 via the set of illumination optics 616. In embodiments, the system 600 collects illumination emanating from the sample via the set of collection optics 618. The set of illumination optics 616 may include one or more beam conditioning components 620 suitable for modifying and/or conditioning the broadband beam. For example, the one or more beam conditioning components 620 may include, but are not limited to, one or more polarizers, one or more filters, one or more beam splitters, one or more diffusers, one or more homogenizers, one or more apodizers, one or more beam shapers, or one or more lenses.

In embodiments, the set of illumination optics 616 may utilize a first focusing element 622 to focus and/or direct the beam onto the sample 507 disposed on the sample stage 612. In embodiments, the set of collection optics 618 may include a second focusing element 626 to collect illumination from the sample 507.

In embodiments, the detector assembly 628 is configured to capture illumination emanating from the sample 507 through the set of collection optics 618. For example, the detector assembly 628 may receive illumination reflected or scattered (e.g., via specular reflection, diffuse reflection, and the like) from the sample 507. By way of another example, the detector assembly 628 may receive illumination generated by the sample 507 (e.g., luminescence associated with absorption of the beam, and the like). It is noted that detector assembly 628 may include any sensor and detector assembly known in the art. For example, the sensor may include, but is not limited to, CCD detector, a CMOS detector, a TDI detector, a PMT, an APD, and the like.

The set of collection optics 618 may further include any number of collection beam conditioning elements 630 to direct and/or modify illumination collected by the second focusing element 626 including, but not limited to, one or more lenses, one or more filters, one or more polarizers, or one or more phase plates.

The system 600 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. Pat. No. 7,957,066, entitled "Split Field Inspection System Using Small Catadioptric Objectives," issued on Jun. 7, 2011; U.S. Pat. No. 7,345,825, entitled "Beam Delivery System for Laser Dark-Field Illumination in a Catadioptric Optical System," issued on Mar. 18, 2018; U.S. Pat. No. 5,999,310, entitled "Ultra-broadband UV Microscope Imaging System with Wide Range Zoom Capability," issued on Dec. 7, 1999; U.S. Pat. No. 7,525,649, entitled "Surface Inspection System Using Laser Line Illumination with Two Dimensional Imaging," issued on Apr. 28, 2009; U.S. Pat. No. 9,228,943, entitled "Dynamically Adjustable Semiconductor Metrology System," issued on Jan. 5, 2016; U.S. Pat. No. 5,608,526, entitled "Focused Beam Spectroscopic Ellipsometry Method and System, issued on Mar. 4, 1997; and U.S. Pat. No. 6,297,880, entitled "Apparatus for Analyzing Multi-Layer Thin Film Stacks on Semiconductors," issued on Oct. 2, 2001, which are each incorporated herein by reference in their entirety.

Figure 7:
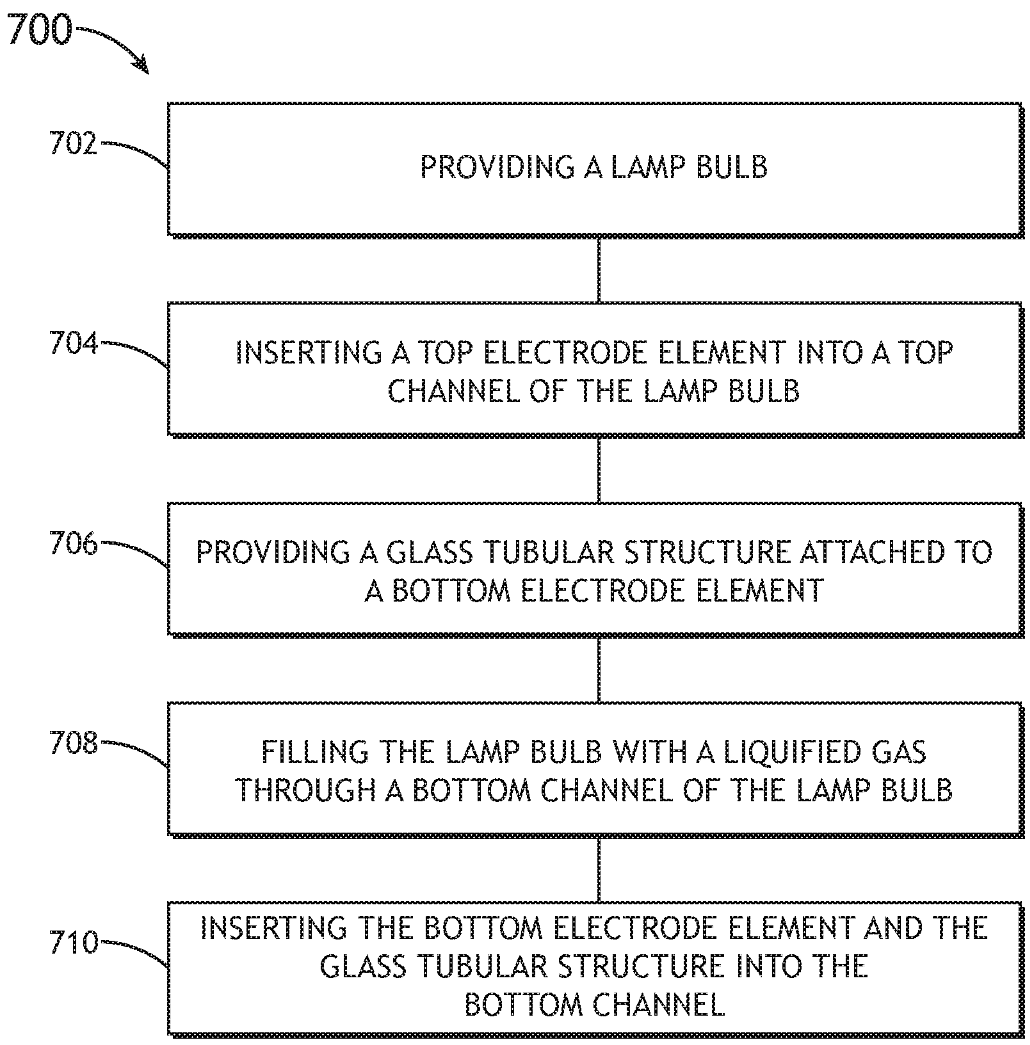
FIG. 7 illustrates a flow diagram depicting a method of fabricating a high-pressure plasma lamp with electrodes, in accordance with one or more embodiments of the present disclosure.

FIG. 7 illustrates a flow diagram depicting a method 700 of fabricating a plasma lamp with electrodes, in accordance with one or more embodiments of the present disclosure. In step 702, a lamp bulb is provided. The lamp bulb may include a top channel and a bottom channel. In step 704, a top electrode element is inserted into the top channel of the lamp bulb. In step 706, a glass tubular structure attached to a bottom electrode element is provided. In step 708, the lamp bulb is filled with a liquified gas through the bottom channel of the lamp bulb. In step 710, the bottom electrode element and the glass tubular structure is inserted into the bottom channel.

Figure 8:
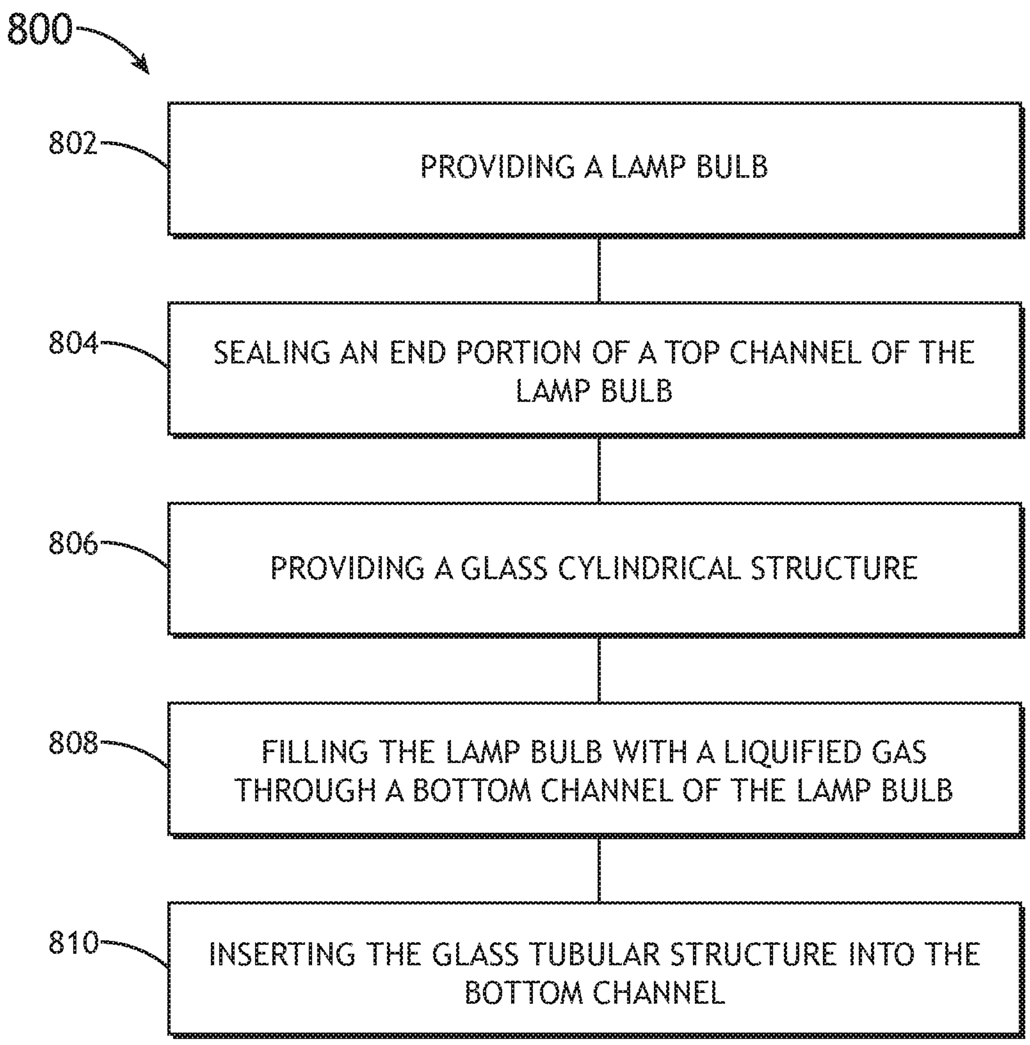
FIG. 8 illustrates a flow diagram depicting a method of fabricating a high-pressure plasma lamp without electrodes, in accordance with one or more embodiments of the present disclosure.

FIG. 8 illustrates a flow diagram depicting a method 800 of fabricating a plasma lamp without electrodes, in accordance with one or more embodiments of the present disclosure. In step 802, a lamp bulb is provided. The lamp bulb may include a top channel and a bottom channel. In step 804, an end portion of the top channel of the lamp bulb is sealed. In step 806, a glass cylindrical structure is provided. In step 808, the lamp bulb is filled with a liquified gas through the bottom channel of the lamp bulb. In step 810, the glass cylindrical structure is inserted into the bottom channel.

It is further contemplated that each of the embodiments of the method described above may include any other step(s) of any other method(s) described herein. In addition, each of the embodiments of the method described above may be performed by any of the systems described herein One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A high-pressure plasma lamp comprising:

a lamp bulb, the lamp bulb comprising a lamp body; a top channel; and a bottom channel;

a top electrode element sealed within the top channel; and a bottom electrode element sealed within a glass tubular structure, the glass tubular structure sealed within the bottom channel, wherein an interior wall of the bottom channel is sealed to an exterior wall of the glass tubular structure, wherein the bottom electrode element includes a multi-step thickness profile, wherein an internal structure of the glass tubular structure conforms to a portion of the multi-step thickness profile of the bottom electrode element and wherein the outer surface of the bottom electrode element and the outer surface of the glass tubular structure are coextensive, wherein the lamp bulb contains a gas and is configured to generate a plasma within the lamp bulb.

2. The high-pressure plasma lamp of claim 1, wherein the lamp body is port-less.

3. The high-pressure plasma lamp of claim 1, wherein the glass tubular structure is formed from the same material as the bottom channel.

4. The high-pressure plasma lamp of claim 3, wherein the glass tubular structure and the bottom channel are formed from a fused silica glass material.

5. The high-pressure plasma lamp of claim 1, wherein the gas comprises at least one Xe, Ar, Ne, Kr, He $N_2$, $H_2O$, $O_2$, $H_2$, $D_2$, $F_2$, $SF_6$, or a mixture of two or more Xe, Ar, Ne, Kr, He, $N_2$, $H_2O$, $O_2$, $H_2$, $D_2$, $F_2$, or $SF_6$.

6. The high-pressure plasma lamp of claim 1, wherein the top electrode element comprises an anode and the bottom electrode element comprises a cathode.

7. The high-pressure plasma lamp of claim 6, wherein the top electrode element and the bottom electrode element are configured to initiate plasma generation within the body.

* * * * *